(12) United States Patent
Ohara

(10) Patent No.: US 7,339,150 B2
(45) Date of Patent: Mar. 4, 2008

(54) IMAGING UNIT AND IMAGE READING APPARATUS

(75) Inventor: Toshimitsu Ohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/263,782

(22) Filed: Oct. 31, 2005

(65) Prior Publication Data
US 2006/0097131 A1    May 11, 2006

(30) Foreign Application Priority Data
Oct. 29, 2004    (JP)    ............................ P2004-315361

(51) Int. Cl.
| | | |
|---|---|---|
| H01L 27/00 | (2006.01) | |
| H01J 3/14  | (2006.01) | |
| H04N 1/40  | (2006.01) | |
| H04N 1/024 | (2006.01) | |
| G06K 9/00  | (2006.01) | |
| G06K 7/00  | (2006.01) | |

(52) U.S. Cl. .................. 250/208.1; 250/216; 250/234; 358/471; 358/473; 382/162; 382/312

(58) Field of Classification Search ............. 250/208.1, 250/214 R, 216, 226, 234; 358/474, 475, 358/482, 483, 487, 494, 497, 505, 506, 509, 358/512, 513, 514, 518, 471, 473, 519; 382/140, 382/162, 312, 313; 359/196, 212, 619, 621; 257/293, 433, 435; 356/407, 435, 445
See application file for complete search history.

(56) References Cited

U.S. PATENT DOCUMENTS

| | | | |
|---|---|---|---|
| 6,643,038    B1 * | 11/2003 | Kawahara et al. | .......... 358/512 |
| 2002/0048055 A1 * | 4/2002  | Yushiya         | ...................... 358/518 |
| 2006/0077475 A1 * | 4/2006  | Ta Su           | .......................... 358/474 |

FOREIGN PATENT DOCUMENTS

JP    2004-126284    4/2004

\* cited by examiner

*Primary Examiner*—Georgia Epps
*Assistant Examiner*—Don Williams
(74) *Attorney, Agent, or Firm*—John J. Penny, Jr.; Edwards Angell Palmer & Dodge LLP

(57)    ABSTRACT

A first light source is adapted to illuminate a first object with first light. A first sensor includes a first light receiving element adapted to detect the first light by way of the first object. A second sensor includes a second light receiving element adapted to detect a second light which is externally inputted by way of a second object. A transparent member is disposed on at least one of a first optical path extending from the first object to the first sensor through a first lens and a second optical path extending from the second object to the second sensor through a second lens.

14 Claims, 10 Drawing Sheets

IMAGING UNIT AND IMAGE READING APPARATUS

BACKGROUND OF THE INVENTION

The present invention relates to an imaging unit and to an image reading apparatus.

JP-A-2004-126284 discloses a contact image sensor module capable of clearly reading a translucent original held away from a surface of an original table by a holder or the like. In the contact image sensor module described in JP-A-2004-126284, a first rod lens array forms an optical image of a refection original on a light receiving surface of a first image sensor. A second rod lens array forms an optical image of a translucent original on a light receiving surface of a second image sensor. Thus, the contact image sensor module described in JP-A-2004-126284 can detect the reflection original, which is placed on the surface of the original table, and the translucent original disposed away from the surface of the original table.

However, to clearly form an optical image of the reflection original and an optical image of the translucent original on two image sensors, the contact image sensor module described in JP-A-2004-126284 needs to have two rod lens arrays, which differ in conjugate length from each other, and to provide a difference of elevation between the mounting surfaces of the two image sensors, which is used for adjusting focal positions. The conjugate length of a rod lens array is discretely determined according to a standard. This contact image sensor module has problems in that it is not easy to design a contact image sensor module, which clearly detects a reflection original and a translucent original, by selecting two kinds of rod lens arrays, which differ in conjugate length from each other, according to places, on which originals are placed, from standardized products, and that on the other hand, the manufacturing cost thereof increases in the case of using nonstandard rod lens arrays. Also, in the case of providing the difference of elevation between the mounting surfaces of the two image sensors to adjust the focal positions, this contact image sensor module has a problem in that the manufacturing cost increases due to complication of the structure thereof.

It is necessary to read image information recorded on a translucent original, such as a photographic film, at a resolution that is higher than a resolution at which image information recorded on a reflection original. However, each of the two image sensors described in JP-A-2004-126284 is what is called a one-channel image sensor. In the description, the "one-channel image sensor" means an image sensor constituted by a light receiving element having a single spectral sensitivity characteristic. Further, the multi-channel image sensor means an image sensor constituted by a plurality kinds of light receiving elements differing in spectral sensitivity characteristic from one another. Practically, for example, a three-channel image sensor is an image sensor including three kinds of light receiving elements respectively having red, green, and blue on-chip color filters. Therefore, an image reading apparatus having the contact image sensor module described in JP-A-2004-126284 detects pieces of image information respectively corresponding to channels, which are recorded on a translucent original, in a time sharing manner. In the case where image information corresponding to each channel, which is recorded on the original is read in a time sharing manner, a reading rate is low, as compared with a case where pieces of image information respectively corresponding to the channels are read in parallel. Thus, the image reading apparatus has a problem in that a read time is long. On the other hand, in the case where pieces of image information respectively corresponding to the channels are read in parallel, it is necessary to use image sensors having a large number of pixels, as compared with the case where the pieces of image information corresponding to the channels are read in a time sharing manner, and so that the manufacturing cost is increased.

SUMMARY

It is therefore an object of the invention to provide an imaging unit enabled to clearly read a plurality of kinds of objects positioned at places differing from one another and to reduce a read time while suppressing the manufacturing cost thereof. It is also an object of the invention is to provide an image reading apparatus having an imaging unit enabled to clearly read a plurality of kinds of objects positioned at places differing from one another and to reduce a read time while suppressing the manufacturing cost thereof.

In order to achieve the object, according to the invention, there is provided an imaging unit comprising:

a first light source adapted to illuminate a first object with first light;

a first sensor, including a first light receiving element adapted to detect the first light by way of the first object;

a second sensor, including a second light receiving element adapted to detect a second light which is externally inputted by way of a second object;

a first lens;

a second lens; and a transparent member, disposed on at least one of a first optical path extending from the first object to the first sensor through the first lens and a second optical path extending from the second object to the second sensor through the second lens.

With this configuration, the imaging unit is provided with the transparent member on at least one of the first optical path and the second optical path such that the transparent member is adapted to cause the first lens to clearly form an optical image of the first object on a light receiving surface of the first light receiving element, and is adapted to cause the second lens to clearly form an optical image of the second object on a light receiving surface of the second light receiving element. Thus, the conjugate length of the first lens and that of the second lens can be designed to be advantageous in reducing the manufacturing cost of the imaging unit. For example, the first lens and the second lens may be constituted by lenses having the same conjugate length. Thus, the manufacturing cost can be reduced. Alternatively, the first lens and the second lens may be respectively constituted by two low-manufacturing-cost lenses having differing conjugate lengths.

The second light may include white light, and the second light receiving element may include a plurality kinds of third light receiving elements differing in spectral sensitivity characteristic from one another.

In this case, the second image sensor has the multi-channel second light receiving elements. The multi-channel second image sensor detects pieces of image information corresponding to the plurality of channels in parallel. That is, the detecting rate of the second image sensor is higher than that of the first image sensor which is a one-channel first image sensor detecting pieces of image information corresponding to channels in a time sharing manner. Thus, the imaging unit can reduce a read time taken to read the second object.

First conjugate length of the first sensor may be equal to second conjugate length of the second sensor. First resolution of the first sensor may differ from second resolution of the second sensor. In this case, the resolution of the first image sensor and that of the second image sensor can individually be designed according to the resolution that is necessary for reading the object. Thus, the manufacturing cost of the imaging unit can be reduced.

First longitudinal width of first light receiving element may differ from second longitudinal width of the second light receiving element. In this case, the longitudinal length of the first light receiving element and the longitudinal length of second light receiving element can individually be designed according to the length in a main scanning direction of the object. Thus, the manufacturing cost of the imaging unit can be reduced.

The first sensor and the second sensor may be directly mounted onto a same substrate. In this case, the structure thereof is simplified by mounting the first image sensor and the second image sensor directly to the same substrate. The manufacturing cost can be reduced. Incidentally, the mounting of an image sensor directly to the substrate is to mount the image sensor directly to the substrate without interposing a member, such as a spacer, to be used to adjust the focal position. Practically, for example, pads of the substrate are soldered to terminals of the image sensor. Incidentally, the member to be used to adjust the focal position includes neither a packaging member of the first image sensor nor a packaging member of the second image sensor. That is, a state, in which an image sensor is directly mounted onto a substrate, includes a state in which a packaged first image sensor is directly mounted onto the substrate, and a state in which a packaged second image sensor is directly mounted onto the substrate.

The transparent member may be colored. In this case, the spectral sensitivity characteristic of the image sensor can be adjusted.

The transparent member may be disposed on the second optical path.

The first light receiving element may be adapted to detect the first light reflected by the first object, and the second light receiving element may be adapted to detect the second light passing through the second object. Generally, it is necessary to read translucent originals at a resolution that is higher than a resolution at which translucent originals are read. In this case, an optical image of a translucent original serving as the second object is detected by the multi-channel second image sensor. Thus, a read time required to read a translucent original can be reduced. Generally, the width in the main scanning direction of the translucent original is less than that in the main scanning direction of the reflection original. In this case, only the second image sensor adapted to detect translucent originals has the multi-channel second light receiving elements. Thus, the manufacturing cost can be suppressed.

The transparent member may be made of glass. The transparent member may be made of synthetic resin.

According to the invention, there is provided an image reading apparatus comprising:

a first light source adapted to illuminate a first object with first light;

a second light source adapted to illuminate a second object with second light.

a first sensor, including a first light receiving element adapted to detect the first light by way of the first object;

a second sensor, including a second light receiving element adapted to detect the second light by way of the second object;

a first lens;

a second lens; and a transparent member, disposed on at least one of a first optical path extending from the first object to the first sensor through the first lens and a second optical path extending from the second object to the second sensor through the second lens.

DETAIL DESCRIPTION OF PREFERRED EMBODIMENTS

Figure 1A:
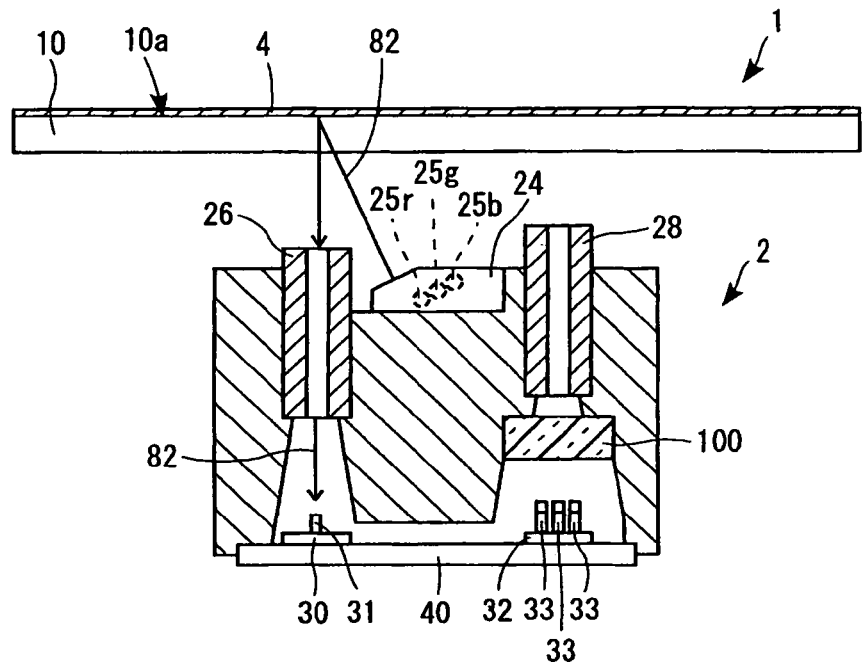
FIG. 1A is a schematic view illustrating an operation of reading a reflection original by an image scanner according to a first embodiment.

Hereinafter, the mode for carrying out the invention is described according to a plurality of embodiments of the invention. Incidentally, like reference numerals designate like or corresponding constituent elements and corresponding processes among several drawings showing the embodiments. Thus, the duplicate description of the corresponding constituent elements and the corresponding processes thereamong is omitted.

First Embodiment

Figure 2:
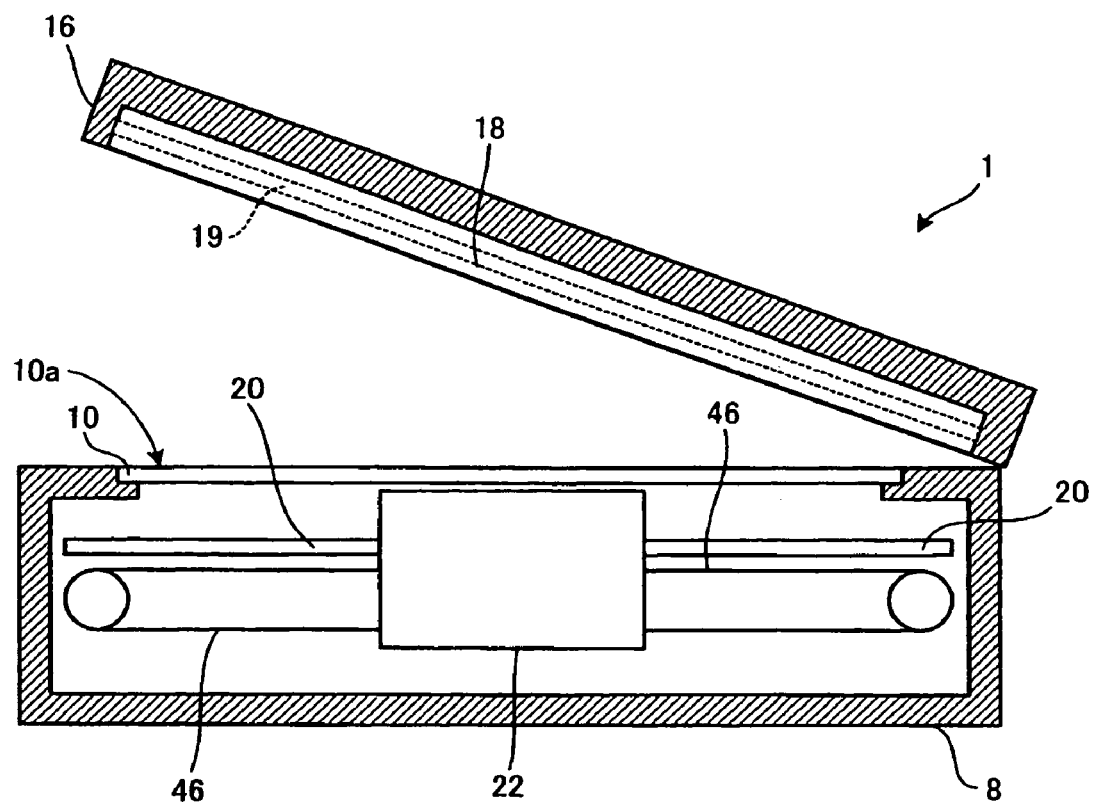
FIG. 2 is a schematic view illustrating the image scanner according to the first embodiment.

As shown in FIG. 2, the image scanner 1 serving as an image reading apparatus is what is called a flatbed image scanner. The image scanner 1 can read reflection originals and translucent originals. The reflection originals are printed documents, photographs, and so on. The translucent originals are a 35 mm photographic film, a Brownie size photographic film, a slide film, and so forth. The following description is given by assuming that maximum size of the reflection original is A4 size or A4/Letter size, and that the translucent original is a 35 mm film. Incidentally, the image reading apparatus may be a complex machine, a copier, a facsimile machine with a copying function, or the like.

A housing 8 is formed like a box opened in the top end thereof. An original table 10 is supported on the opened side of the housing 8. The original table 10 is formed of a transparent plate, such as a substantially rectangular glass plate. A reflection original 4 or a 35 mm film 6 is placed on a surface 10a of the original table 10 (see FIGS. 1A and 1B). The 35 mm film 6 is held 1 mm apart above the surface 10a of the original table 10 by a holder 14.

Figure 3:
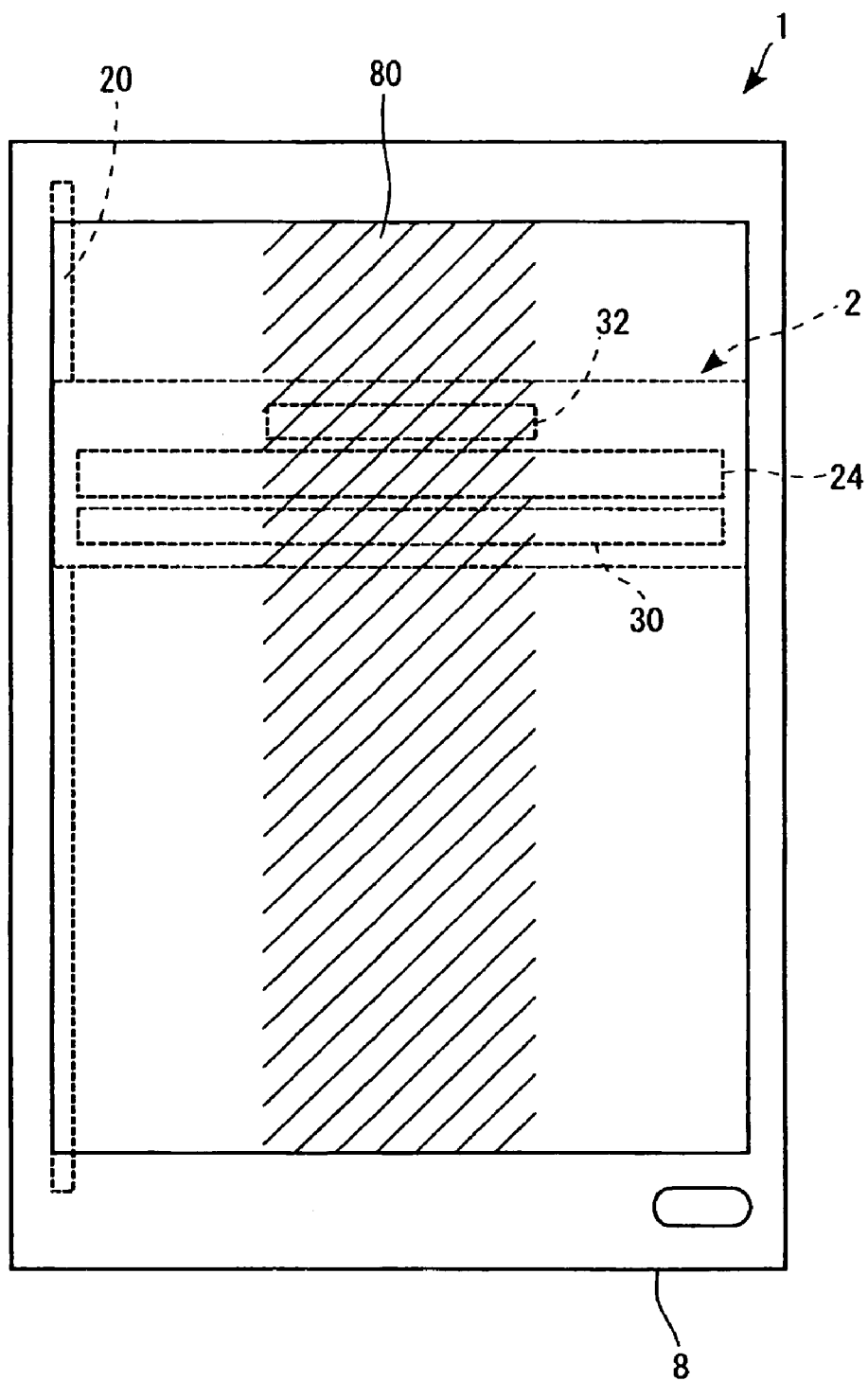
FIG. 3 is a schematic view illustrating the image scanner according to the first embodiment.

A translucent original illuminating part 18 is disposed on a side of an original cover 16, which side faces the original table 10. The translucent original illuminating part 18 includes a fluorescent tube lamp 19, a reflector (not shown), and a diffusion plate. The fluorescent tube lamp 19 is disposed so that a longitudinal axis line thereof extends in parallel to a central axis line of a guide rod 20. Consequently, the translucent original illuminating part 18 can illuminate a reading area 80 (see FIG. 3) of the 35 mm film 6 with uniform illuminance. Incidentally, The translucent original illuminating part 18 may include a light emitting diode (LED) and a light guiding member instead of the fluorescent tube lamp 19.

A carriage 22 is slidably held by the guide rod 20. A contact image sensor module serving as an imaging unit is mounted on the carriage 22.

Figure 4:
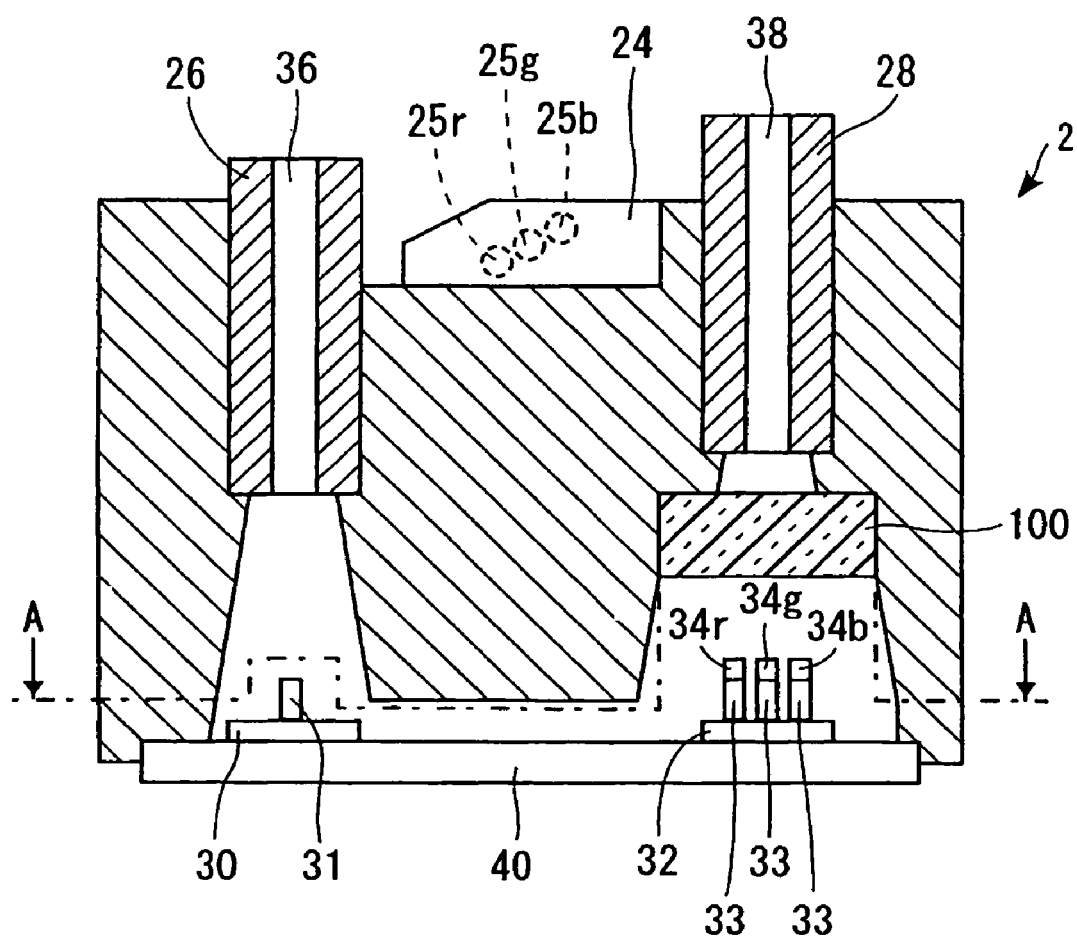
FIG. 4 is a schematic view illustrating a contact image sensor module according to the first embodiment.

As shown in FIG. 4, the contact image sensor module 2 includes a first image sensor 30, a second image sensor 32, a first lens array 26, a second lens array 28, a transparent member 100, a reflection original illuminating part 24, and a substrate 40.

The first image sensor 30 is directly mounted on the substrate 40. Practically, the first image sensor 30 is mounted on the substrate 40 by soldering external terminals thereof to pads of the substrate 40, respectively. The first image sensor 30 includes a plurality of first light receiving elements 31 linearly aligned in one line (see FIG. 5B), and a MOS transistor switch. The first image sensor 30 scans an optical image of the reflection original 4 and outputs electric signals correlated with the densities of the optical image.

The second image sensor 32 is directly mounted on the substrate 40. Practically, the second image sensor 32 is mounted on the substrate 40 by soldering external terminals thereof to pads of the substrate 40, respectively. The second image sensor 32 includes a plurality of second light receiving elements 32 linearly aligned in three lines (see FIG. 5B), and a MOS transistor switch. The lines of the second light receiving elements 33 are arranged in parallel to the line of the first light receiving elements 31, and are provided with color filters having different characteristics, respectively. Practically, the color filters are a filter adapted to transmit red light (a red filter) 34r, a filter adapted to transmit green light (a green filter) 34g, and a filter adapted to transmit blue light (a blue filter) 34b. Consequently, white light radiated from the fluorescent tube lamp 19 can be color-separated into red light, green light, and blue light. Thus, the second image sensor 32 can detect pieces of image information, which respectively correspond to channels (an R-channel, a G-channel, and a B-channel), in parallel. Incidentally, the color filters may be separated from the second image sensor 32.

The longitudinal width of the first image sensor 30 and that of the second image sensor 32 are designed according to the specifications of the image scanner 1. Practically, the longitudinal width of the range of alignment of the first light receiving elements 31 arranged in the first image sensor 30 is 218 mm at which originals of A4 size can be detect. The longitudinal width of the range of alignment of the second light receiving elements 32 arranged in the second image sensor 32 is 27 mm at which a 35 mm film can be detect. Incidentally, although the foregoing description has been made by assuming that the longitudinal width of the first image sensor 31 differs from the longitudinal with of the second image sensor 32, the first image sensor 31 and the second image sensor 32 may have the same longitudinal width.

The resolutions of the first image sensor 30 and the second image sensor 32 are designed according to the specifications of the image scanner 1. Practically, the resolution of the first image sensor 30 is 1200 dpi at which image information recorded on the reflection original 4 can sufficiently be reproduced. The resolution of the second image sensor 32 is 2400 dpi at which image information recorded on the 35 mm film 6 can sufficiently be reproduced. Incidentally, although the foregoing description has been made by assuming that the resolution of the first image sensor 30 differs from the resolution of the second image sensor 32, the first image sensor 31 and the second image sensor 32 may have the same resolution.

The first lens array 26 includes a plurality of linearly aligned cylindrical lenses (first rod lenses) 36. As shown in FIG. 1A, the first lens array 26 forms an optical image of the reflection original 4 on the light receiving surface of the first light receiving element 31 so that the optical image has the same size as the original 4. The conjugate length of the first lens array 26 is designed according to the distance from the surface 10a of the original table 10 to the light receiving surface of the first light receiving element 31. Further, the first lens array 26 is disposed so that the focal point (what is called a front focal point) thereof at the side of the original table 10 is positioned on the surface 10a of the original table 10, and that the focal point (what is called a back focal point) thereof at the side of the first image sensor 30 is positioned on the light receiving surface of the first light receiving element 31. Hereinafter, the focal point of each of the first lens array 26 and the second lens array 28 at the side of the original table 10, and the focal point of each of the lens arrays 26 and 28 at the side of the image sensor are referred to as a "front focal point" and a "back focal point", respectively.

Figure 1B:
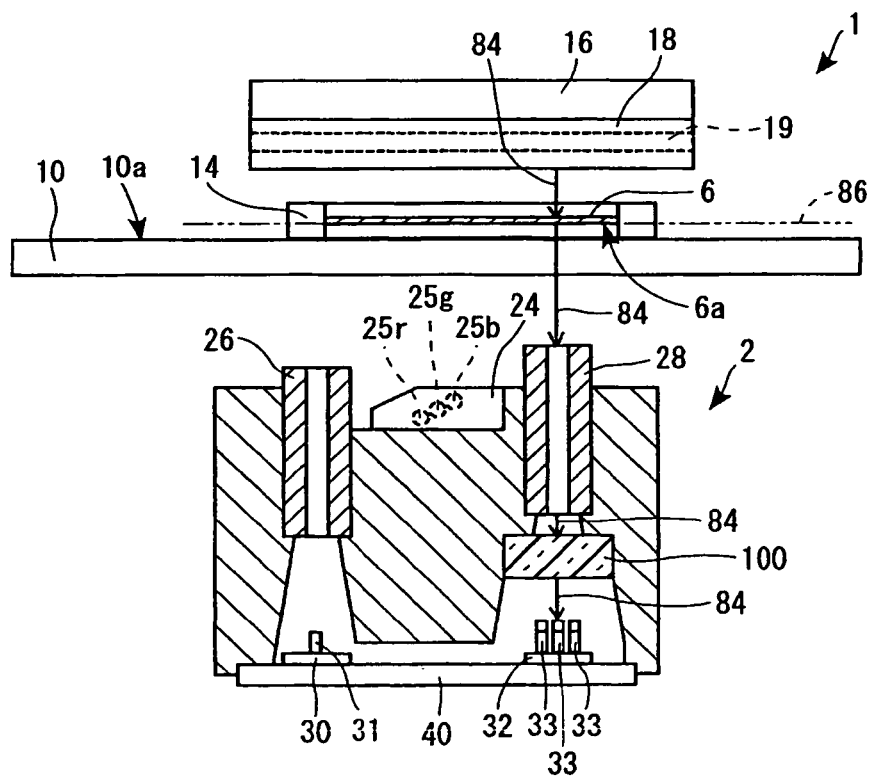
FIG. 1B is a schematic view illustrating an operation of reading a translucent original.

The second lens array 28 has a configuration similar to the configuration of the first lens array 26, and has a plurality of second rod lenses 38. As shown in FIG. 1B, the second lens array 28 is adapted to form an optical image of the 35 mm film 6 on the light receiving surface of the second light receiving element 33. The conjugate length of the second lens array 28 is equal to that of the first lens array 26. Consequently, the manufacturing cost of the first lens array 26 and the second lens array 28 can be reduced. Needless to say, a low cost lens array differing in conjugate length from the first lens array 26 may be used as the second lens array 28. Practically, a low cost rod lens array having such a conjugate length may be selected from, for example, standardized rod lens arrays whose conjugate lengths are discretely determined and may be used as the second lens array 28. The-second lens array 28 is disposed so that the front focal point thereof is positioned on a virtual plane 86, which is placed in parallel to and apart 1 mm above the surface 10a of the original table 10. That is, the front focal point of the second lens array 28 is positioned on the original surface 6a of the 35 mm film 6. However, in a state in which a transparent member 100 (to be described later) is not provided, the back focal point of the second lens array 28 is placed 1 mm above the light receiving surface of the second light receiving element 33. Thus, the second lens array 28 cannot clearly form an optical image of the 35 mm film on the light receiving surface of the second light receiving element 33.

The transparent member 100 is provided on a second optical path 84 extending from the 35 mm film 6 to the light receiving surface of the second light receiving element 33 through the second lens array 28. The material and the thickness of the transparent member 100 are designed so that the back focal point of the second lens array 28 is positioned on the light receiving surface of the second light receiving element 33. Generally, the optical path difference (Δ1) between a light ray traveling in the transparent member, and a light ray traveling in the air is given by the following equation (1):

$$\Delta 1 = (1 - 1/n) \times t \qquad (1)$$

where "n" designates the refractive index of the transparent member and "t" designates the thickness thereof.

Incidentally, in a case where the transparent 100, which is made of glass (n=1.52) and has a thickness of 2.9 mm, is provided on the second optical path 84, the optical path length of light passing though the transparent member 100 is increased about 1 mm according to the equation (1). Therefore, the back optical point of the second lens array 28 is positioned roughly on the light receiving surface of the second light receiving element 33. Thus, the transparent member 100 is adapted to cause the second lens array 28 to clearly form an optical image of the 35 mm film 6 on the light receiving surface of the second light receiving element 33. Incidentally, the material of the transparent member 100 may be acrylic, polycarbonate, or polyethylene terephthalate. At that time, it is advisable to design the thickness of the transparent member 100 according to the refractive index thereof.

The reflection original illuminating part 24 includes a plurality of light sources, which are adapted to emit light rays differing in color from one another, and a light guiding member. Practically, the plurality of light sources are an LED (a red LED) 25r adapted to emit red light, an LED (a green LED) 25g adapted to emit green light, and an LED (a blue LED) 25b adapted to emit blue light, which are used to read a color image. The light radiated from the LEDs is guided toward the original table 10 by the light guiding member (not shown) and is uniformly diffused over the scanning range of the reflection original 4. The light guiding member is formed of an optical transparent member made of glass or the like. Incidentally, each of the red LED 25r, the green LED 25g, and the blue LED 25b may be either a dip LED or a chip LED. Also, each of the red LED 25r, the green LED 25g, and the blue LED 25b may be a chip LED integrated into one chip. Further, the reflection original illuminating part 24 may include a discharge lamp, such as a fluorescent tube lamp, and plurality of color filters permitting light rays, which differ in color from one another, to pass therethrough.

Figure 5A:
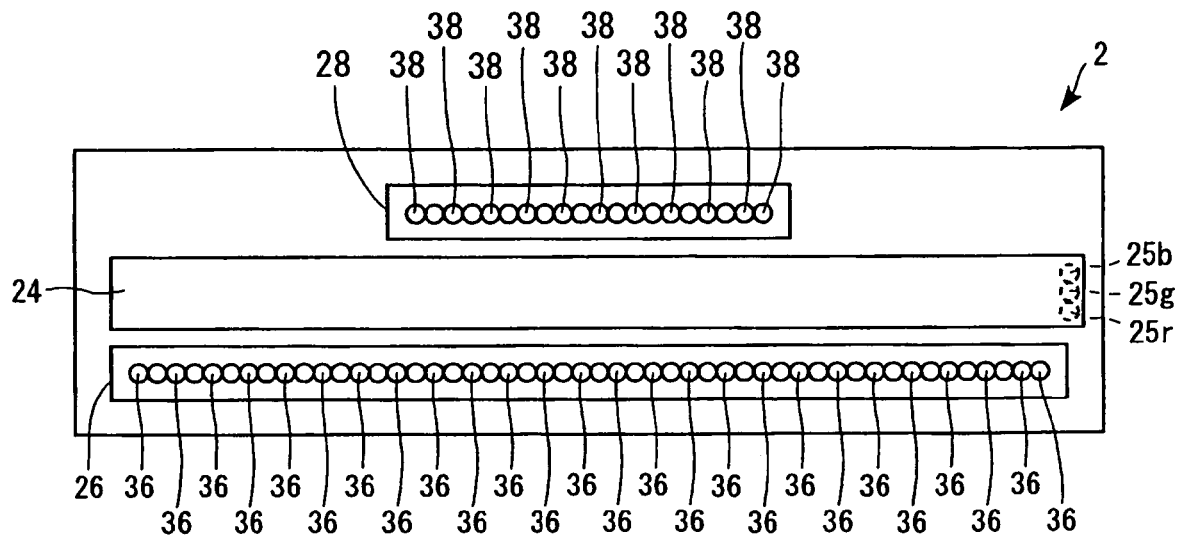
FIG. 5A is a top view illustrating the contact image sensor module according to the first embodiment.
Figure 5B:
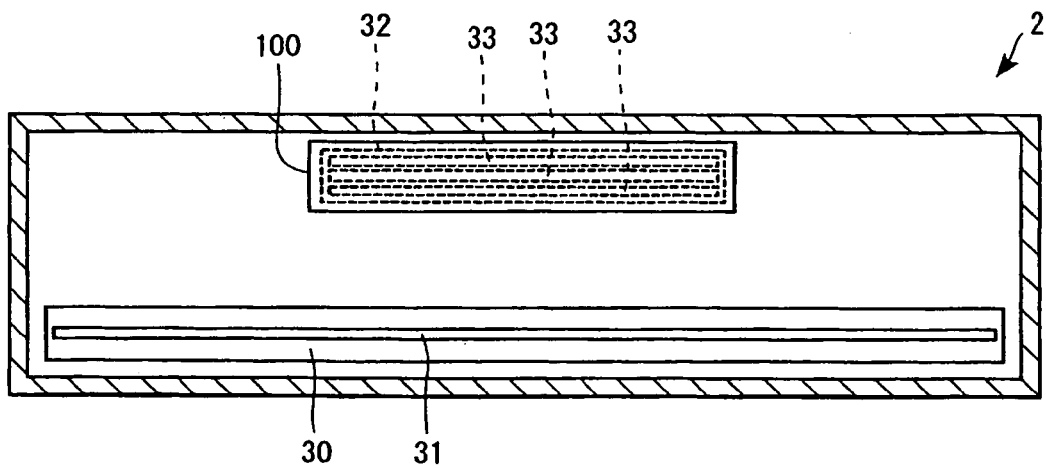
FIG. 5B is a cross-sectional view taken along line A-A shown in FIG. 4.

As shown in FIGS. 5A and 5B, the first image sensor 30 and the second image sensor 32 are disposed and arranged by employing the center in the longitudinal direction thereof as a reference point. The reflection original illuminating part 24 and the first lens array 26 are disposed and arranged by employing the center in the longitudinal direction of the first image sensor 30 as a reference point. Further, the second lens array 28 and the transparent member 100 are disposed and arranged by employing the center in the longitudinal direction of the second image sensor 32. Incidentally, the arrangement of the constituent elements of the contact image sensor module 2 is not limited to the aforementioned arrangement. For instance, the first image sensor 30 and the second image sensor 32 may be disposed and arranged by employing an end in the longitudinal of one of these sensors as a reference point.

Figure 6:
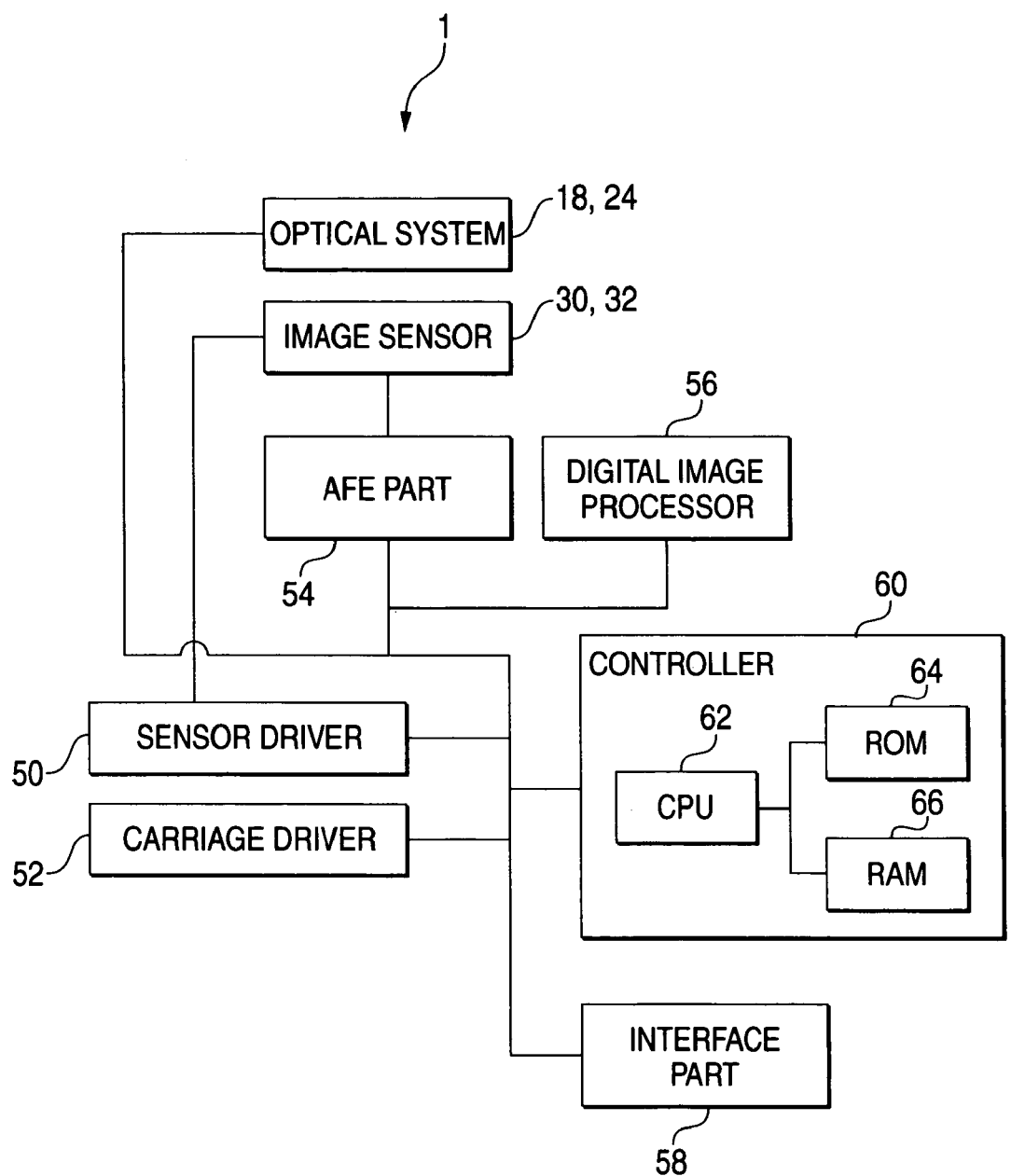
FIG. 6 is a block view illustrating the image scanner according to the first embodiment.

As shown in FIG. 6, a sensor driver 50 is a circuit adapted to output pulse signals used to the first image sensor 30 and the second image sensor 32.

A carriage driver 52 includes a motor (not shown), a drive circuit (not shown), and a drive belt 46. The carriage driver 52 causes the carriage 22 to reciprocate along the guide rod 20. The first image sensor 30 and the second image sensor 32 move in a sub scanning direction together with the carriage 22, thereby enabling the scanning of a two-dimensional image.

An AFE (Analog Front End) part 54 includes an analog signal processor and an A/D converter.

A digital image processor 56 performs image processing on output signals outputted from the AFE part 54 and generates a digital image.

An interface part 58 is configured according to communication standards, such as USB (Universal Serial Bus) standards. The image scanner 1 is communicatably connected to a personal computer (PC) (not shown) through the Interface part 58.

A controller 60 has a CPU 62, a ROM 64 and a RAM 66. The CPU 62 executes a computer program stored in the ROM 64 to control each part of the image scanner 1. The ROM 64 is a memory storing various programs and data. The RAM 66 is a memory temporarily storing various programs and data.

As shown in FIG. 1A, the reflection original illuminating part 24, the first lens array 26, and the first image sensor 30 are used in an operation of reading the reflection original 4. The first image sensor 30 detects an optical image formed from light that is radiated from the reflection original illuminating part 24 and is reflected by the reflection original 4.

As shown in FIG. 1B, the translucent original illuminating part 18, the second lens array 28, and the second image sensor 32 are used in an operation of reading the 35 mm film 6. The second image sensor 32 detects an optical image formed from light that is radiated from the translucent original illuminating part 18 and is transmitted by the 35 mm film 6.

Figure 7:
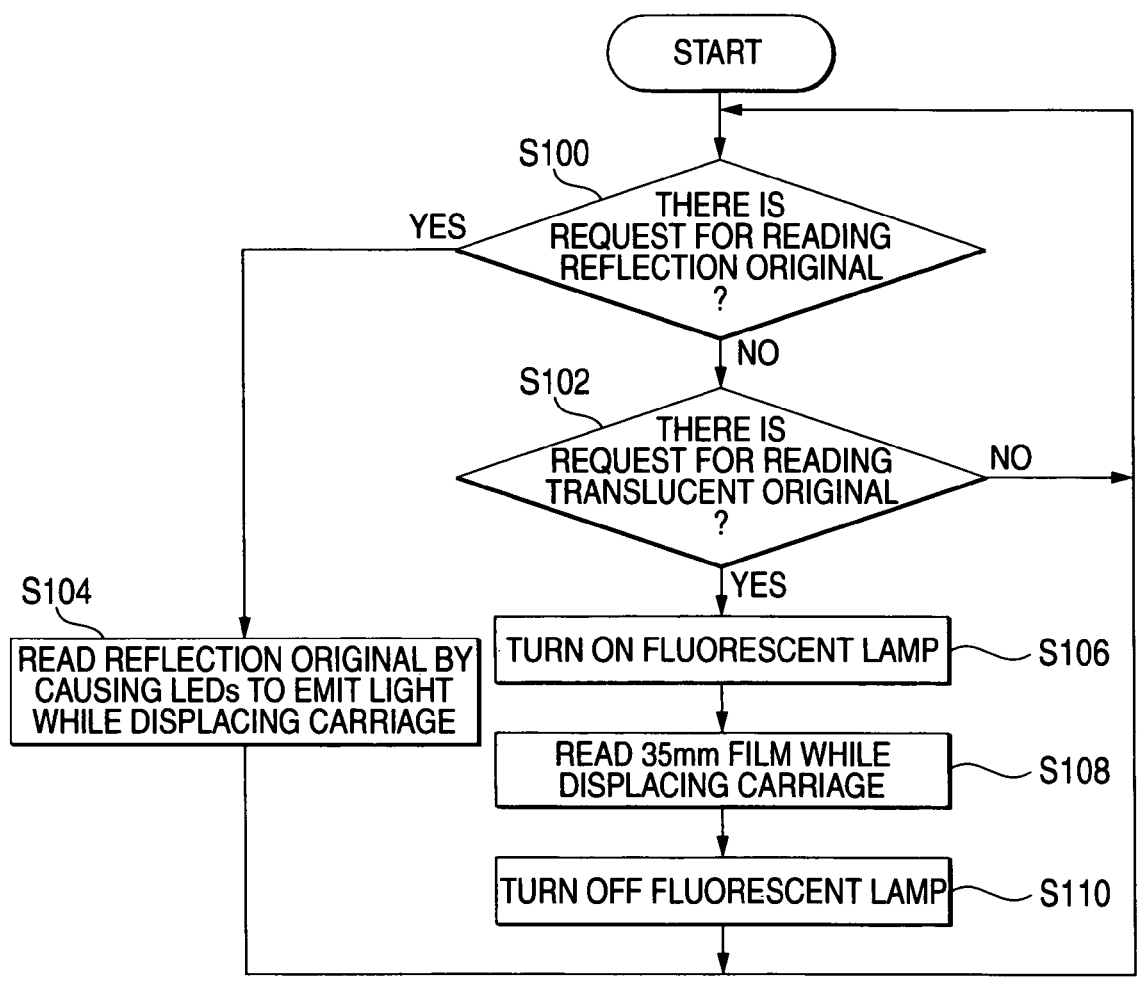
FIG. 7 is a flowchart illustrating a process of reading an original according to the first embodiment.

As shown in FIG. 7, the image scanner 1 accepts a request for reading an original. Practically, for example, the controller 60 accepts a read request by receiving a read request signal transmitted from the PC through the interface part 58. The read request signal is a signal transmitted when a user performs a predetermined operation on the PC to start reading an original. The image scanner 1 can accept a reflection original read request to read the reflection original 4, and also can accept a translucent original read request to read the 35 mm film 6.

First, in steps S100 and S102, the controller 60 decides whether the control 60 accepts a reflection original read request or a translucent original read request. According to a result of the decision, the controller 60 performs the following process. If receiving the reflection original read request, the controller 60 performs a process of reading the reflection original 4 in step S104. If receiving the translucent original read request, the controller 60 performs a process of reading the 35 m film 6 in steps S106 to S110. If receiving neither the reflection original read request nor the translucent original read request, the controller 60 repeats the processing in steps S100 and S102.

In the process of reading the reflection original 4 in step S104, the image scanner 1 reads a color image of 1 line of the reflection original 4 by performing the reading operation three times.

Practically, the controller 60 turns on the red LED 25r, the green LED 25g, and the blue LED 25b of the reflection original illuminating part 24 in a time sharing manner while moving the carriage 22. Thus, the color image of the reflection original 4 is read. For example, the controller 60 turns on the red LED and simultaneously controls the sensor driver 50 to thereby cause the first image sensor 30 to output electrical signals correlated with the densities of the scanning range of the reflection original 4. Then, digital data outputted from the AFE part 54 is stored in the RAM 66 as red component data correlated with the red component of the optical image. Subsequently, the controller 60 turns on the green LED, and causes the RAM 66 to store green component data correlated with the green component of the optical image. Subsequently, the controller 60 turns on the blue LED, and causes the RAM 66 to store blue component data correlated with the blue component of the optical image. When the red component data, the green component data, and the blue component data consecutively read at each of different places are stored in the RAM 66, the controller 60 causes the digital image processor 56 to generate color image data of 1 line according to such digital red, green, and blue component data. The controller 60 repeats reading of data of 1 line by simultaneously moving the carriage until color image data of all lines are generated. Consequently, the image scanner 1 reads the color image of the reflection original 4.

Upon completion of reading the reflection original 4, the controller 60 returns to step S100.

In the process of reading the 35 mm film 6 in steps S106 to S110, the image scanner 1 can read a color image of the 35 mm film 6 of 1 line by performing one reading operation.

Practically, the controller 60 turns on the fluorescent tube lamp 19 in step S106 to thereby illuminate the 35 mm film 6 with white light.

Subsequently, in step S108, the controller 60 converts an optical image of the scanning range of the 35 mm film 6, which image is color-separated by the color filter 44, into electrical signals, which are correlated with the densities of the color components of the optical image, and reads the color image of the 35 mm film 6, by simultaneously moving the carriage 22.

Figure 8:
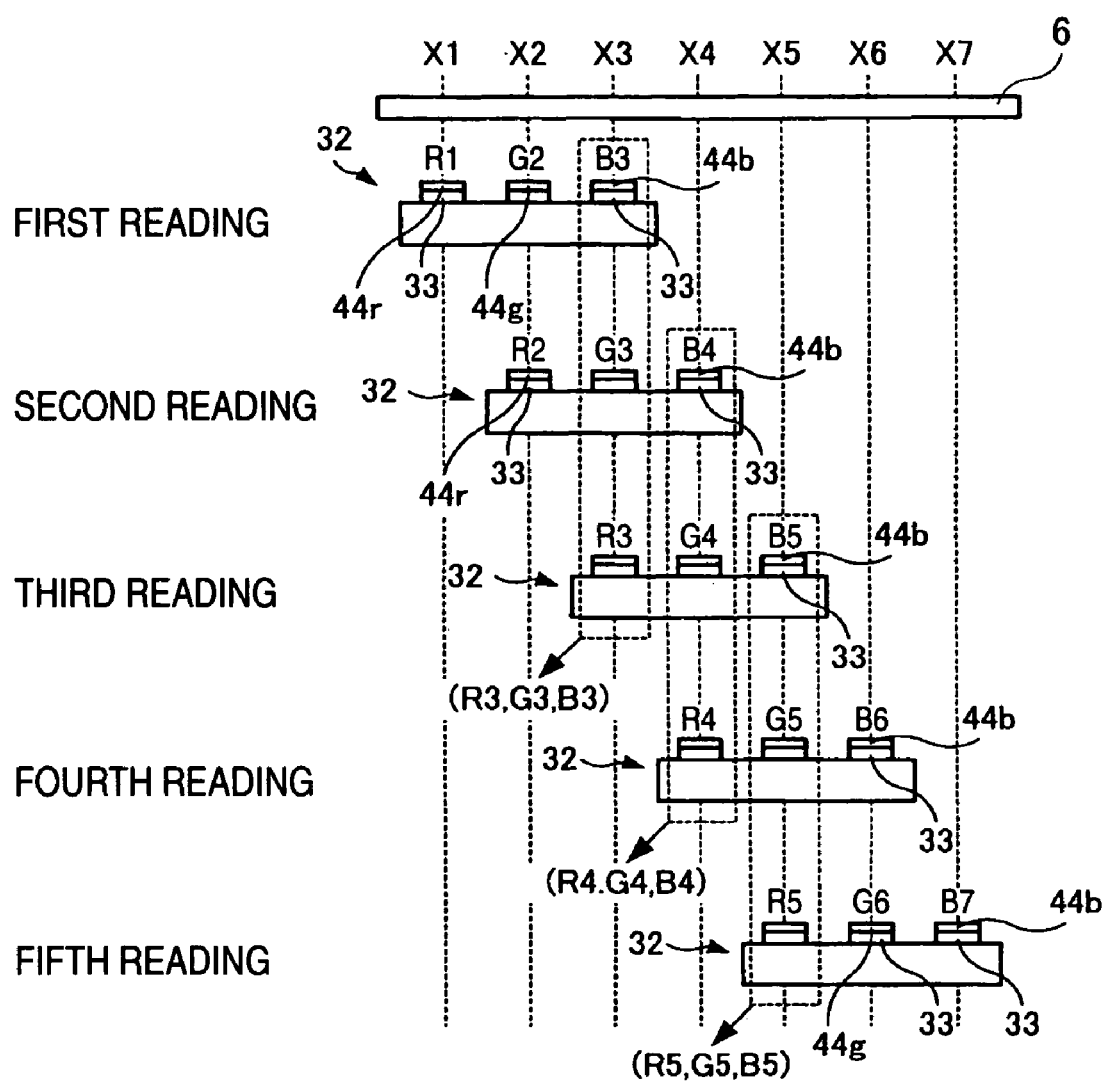
FIG. 8 is a schematic view illustrating a process of reading a translucent original.

FIG. 8 illustrates five reading operations performed since a certain moment. The following description of this example is made by assuming that the reading is repeated every time the carriage 22 moves by the width between the lines of the second light receiving elements 33 of the second image sensor 32, which are disposed by being aligned in three lines. Reference characters X1 to X7 designate reading positions at which the second light receiving element 33 detects the image. Reference characters R1 to R5 denote red component electrical signals that correspond to the R-channel and that are outputted from the second image sensor 32 at the positions X1 to X5, respectively. Reference characters G2 to G6 denote green component electrical signals that correspond to the G-channel and that are outputted from the second image sensor 32 at the positions X2 to X6, respectively. Reference characters B3 to B7 denote blue component electrical signals that correspond to the B-channel and that are outputted from the second image sensor 32 at the positions X3 to X7, respectively.

The second image sensor 32 outputs a red component electrical signal, a green component electrical signal, and a blue component electrical signal in one reading operation performed at an associated one of different positions. That is, the second image sensor 32 detects R-channel image information, G-channel image information, and B-channel image information in parallel. For example, in a first reading operation, the second image sensor 32 simultaneously outputs the red component electrical signal R1, the green component electrical signal G2, and the blue component electrical signal B3. The component electrical signals outputted from the second image sensor 32 are then converted by the AFE part 54 into digital data that is subsequently stored in the RAM 66. When the red component data, the green component data, and the blue component data obtained at this reading position are stored in the RAM 66, the controller 60 generates color image data of 1 line according to such digital data in the digital image processor 56. Upon completion of performing, for instance, a third reading operation, the controller 60 causes the digital image processor 56 to generate color image data ((R3, G3, B3) in this figure) of 1 line according to the red component data, the green component data, and the blue component data, which are stored in the RAM 66 and are obtained at the position X3. Similarly, upon completion of performing a fourth reading operation, the controller 60 causes the digital image processor 56 to generate color image data ((R4, G4, B4) in this figure) of 1 line according to the red component data, the green component data, and the blue component data, which are obtained at the position X4. Upon completion of performing a fifth reading operation, the controller 60 causes the digital image processor 56 to generate color image data ((R5, G5, B5) in this figure) of 1 line according to the red component data, the green component data, and the blue component data, which are obtained at the position X5. As described above, in the process of reading the 35 mm film, the color image data of 3 lines can be obtained by performing the reading operation three times. That is, the color image data of 1 line can be obtained by performing the reading operation once. The controller 60 reads the color image of the 35 mm film 6 by repeating the reading, of the data of 1 line while the carriage 22 is moved, until the color image data of all lines are generated.

Upon completion of reading the color image of the 35 mm film, the controller 60 turns off the fluorescent tube lamp 19 of the translucent original illuminating part 18 in step S10 and returns to step S100. Incidentally, in the processes of reading the reflection original 4 and the 35 mm film 6, the controller 60 may transmit pieces of image information, which respectively correspond to the channels, to the PC through the interface part 58, without generating the color image data of 1 line from the image information corresponding to each channel. At that time, it is advisable to generate the color image data of 1 line in the PC from the image information corresponding to each channel.

In the image scanner 1 according to the aforementioned first embodiment of the invention, the first lens array 26 clearly forms an optical image of the reflection original 4 on the light receiving surface of the first light receiving element 31. Thus, the image scanner 1 can clearly read the reflection original 4 placed on the surface 10a of the original table 10.

The transparent member 100 clearly forms an optical image of the 35 mm film 6 on the second lens array 28. Thus, the image scanner 1 can clearly read the 35 mm film 6 held apart 1 mm above the surface 10a of the original table 10.

Further, the conjugate length of the second lens array 28 is equal to that of the first lens array 26. Thus, the image scanner 1 according to the first embodiment of the invention can reduce the manufacturing cost of the first lens array 26 and the second lens array 28. Consequently, the manufacturing cost of the image scanner 1 can be reduced. Needless to say, in a case where a low-cost lens array, which differs in conjugate length from the first lens array 26, is used as the second lens array 28, the manufacturing cost of the image scanner 1 can be reduced.

Further, the second image sensor 32 has three lines of the second light receiving elements 33, which respectively correspond to the three channels, the image scanner 1 can read pieces of image information on the 35 mm film 6, which respectively correspond to the three channels, in parallel. Thus, the image scanner 1 according to the first embodiment of the invention can reduce a read time required to read the 35 mm film 6, as compared with the image scanner that reads a 35 mm film by using a one-channel image sensor.

Further the resolution of the first image sensor 30 is 1200 dpi, while that of the second image sensor 32 is 2400 dpi. That is, the resolution of the first image sensor 30 and that of the second image sensor 32 can be designed according to the kind of the original. Thus, the image scanner 1 according to the first embodiment of the invention can reduce the manufacturing cost thereof, as compared with the, image scanner having two high-resolution image sensors.

Further, the longitudinal width of the first image sensor 30 is 218 mm, while that of the second image sensor 32 is 27 mm. That is, the longitudinal width of the first image sensor 30 and that of the second image sensor can be designed according to the maximum reading area of the original. Thus, the image scanner 1 according to the first embodiment of the invention can reduce the manufacturing cost, as compared with an image scanner having two image sensors whose longitudinal widths are designed according to the size of the reflection original.

Further, the first image sensor 30 and the second image sensor 32 are mounted onto the substrate 40. It is unnecessary for the image scanner 1 according to the first embodiment of the invention that the position of the light receiving surface of the second light receiving device 33 by mounting the second image sensor 32 onto the substrate 40 through another member, such as a spacer. Thus, the structure of the contact image sensor module 2 can be simplified. Consequently, the manufacturing cost of the image scanner 1 can be reduced.

Second Embodiment

Figure 9:
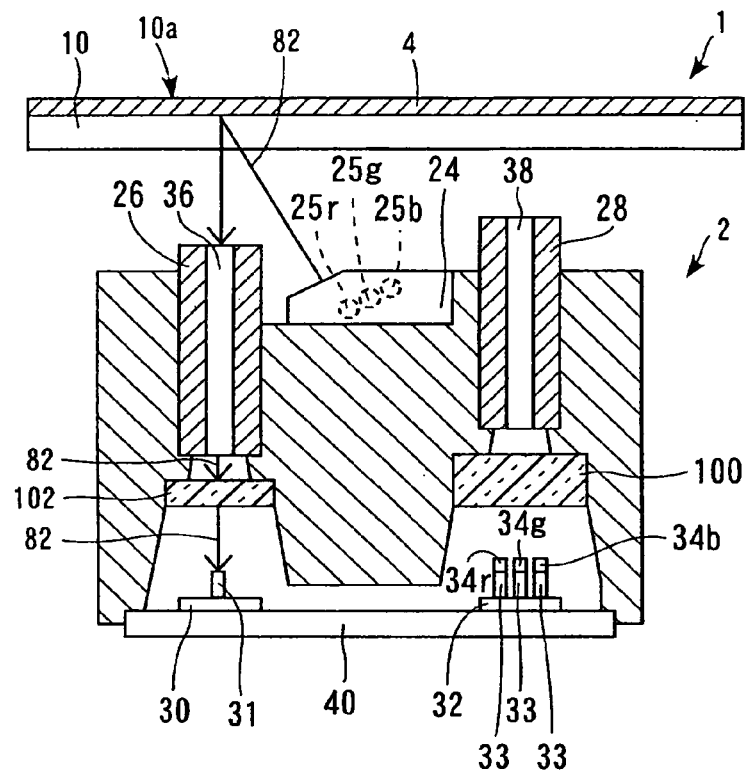
FIG. 9 is a schematic view illustrating a contact image sensor module according to a second embodiment.

As shown in FIG. 9, a transparent member 102 is provided also on a first optical path 82. The rest of the configuration of the image scanner according to the second embodiment is substantially the same as the corresponding configuration of the image scanner 1 according to the first embodiment.

Figure 10:
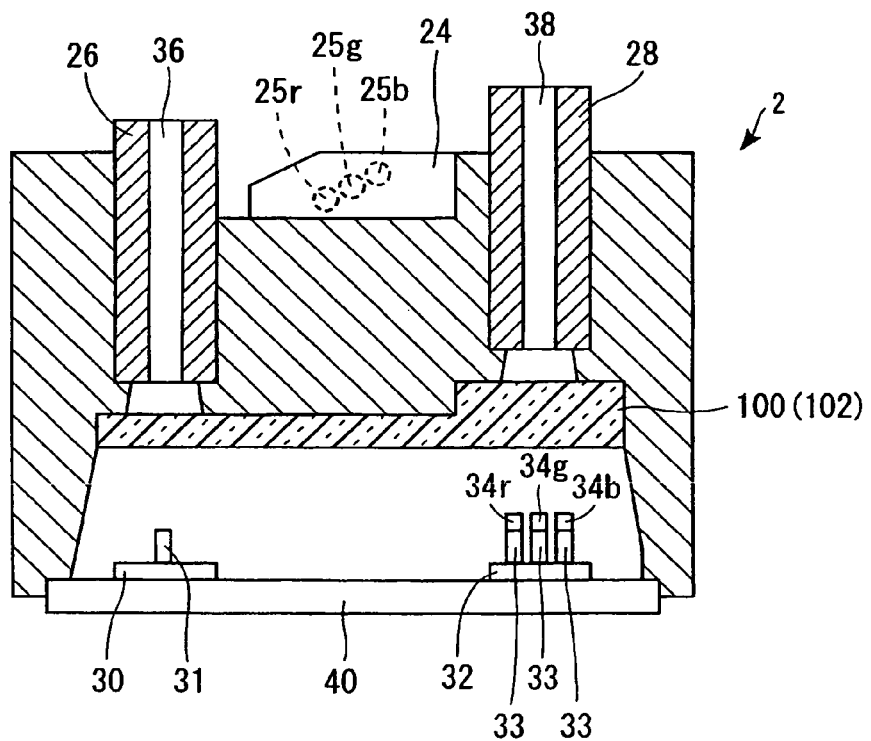
FIG. 10 is a schematic view illustrating the contact image sensor module according to the second embodiment.

The transparent member 102 has a function similar to that of the transparent member 100. The material and the thickness of the transparent member 102 are designed so that the back focal point of the first lens array 26 is positioned on the light receiving surface of the first light receiving element 31. The transparent member 102 is adapted to cause the first lens array 26 to clearly form an optical image of the reflection original 4 on the light receiving surface of the first light receiving element 31. Incidentally, the material of the transparent member 102 may be acrylic, polycarbonate, or polyethylene terephthalate. At that time, it is advisable to design the thickness of the transparent member 102 according to the refractive index thereof. Additionally, the transparent embers 100 and 102 may be formed integrally with each other, as shown in FIG. 10.

In accordance with the image scanner 1 according to the aforementioned second embodiment, the conjugate length of the first lens array 26 and that of the second lens array 28 can freely be designed by designing the material and the thickness of the transparent member 100 according to the conjugate length of the first lens array 26 and also designing the material and the thickness of the transparent member 102 according to the conjugate length of the second lens array 28. Thus, low-cost conjugate length lens arrays can be used as the first lens array and the second lens array. At that time, the conjugate length of the first lens array may be equal to or differ from that of the second lens array.

Third Embodiment

The transparent member 100 of the image scanner 1 according to a third embodiment is colored. The rest of the configuration of the image scanner 1 according to the third embodiment is substantially the same as the corresponding configuration of the image scanner 1 according to the first embodiment. Incidentally, the transparent member 100 may be either entirely or partly colored. Further, the transparent member 100 may be constituted by a plurality of members including uncolored transparent members and colored transparent members.

The colored transparent member 100 functions as a color filter having a characteristic corresponding to the color thereof. Thus, the image scanner 1 according to the third embodiment can adjust the spectral sensitivity characteristic of the second light receiving element 33 by using the transparent portion 100. Consequently, the time required to perform processing, such as color correction, in the digital image processor 56 can be reduced.

Incidentally, although t the first embodiment and the second embodiment have been described by assuming that objects to be read are the reflection original and the translucent original (the 35 mm film 6), the contact image sensor module 2 may be used in an image scanner employing reflection originals as both the objects to be read.

Figure 11:
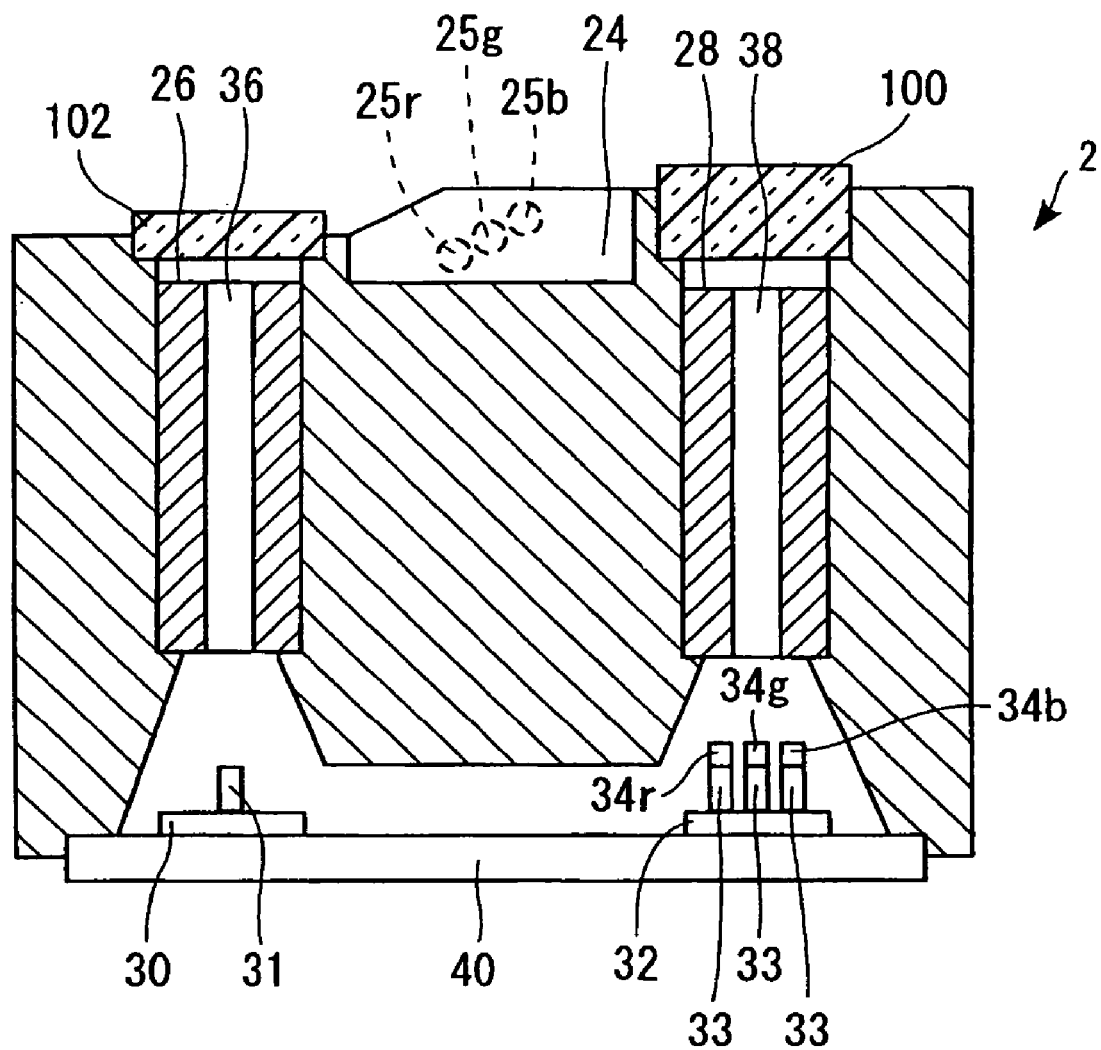
FIG. 11 is a schematic view illustrating a modification of the contact image sensor module.

Further, although the first embodiment and the second embodiment have been described by assuming that the transparent member 100 is provided between the second lens array 28 and the second image sensor 32, the transparent member 100 may be provided between the original table 10 and the second lens array 28 (see FIG. 11).

Furthermore, although the second embodiment has been described by assuming that the transparent member 102 is provided between the first lens array 26 and the first image sensor 30, the transparent member 102 may be provided between the original table 10 and the first lens array 26 (see FIG. 11).

Additionally, although the third embodiment has been described by assuming that the image scanner 1 has the colored transparent member 100, the image scanner 1 may have a colored transparent member 102. Further, the rest of the configuration of the third embodiment may be configured to be substantially the same as that of the second embodiment.

What is claimed is:
1. An imaging unit comprising:
  a first light source adapted to illuminate a first object with first light;
  a first sensor, including a first light receiving element adapted to detect the first light by way of the first object;

a second sensor, including a second light receiving element adapted to detect a second light which is externally inputted by way of a second object;
a first lens;
a second lens; and
a transparent member, disposed on an optical path extending from the second object to the second sensor through the second lens, wherein
a first conjugate length of the first lens is equal to a second conjugate length of the second lens,
the first light receiving element is adapted to detect the first light reflected by the first object and the second light receiving element is adapted to detect the second light passing through the second object,
the second light receiving element includes a plurality of kinds of third light receiving elements provided color filters differing in color from one another
a first resolution of the first sensor is less than a second resolution of the second sensor, and
the third light receiving elements extend in a main scanning direction and are arranged in a sub scanning direction.

2. The imaging unit according to claim 1, wherein the second light includes white light.

3. The imaging unit according to claim 1, wherein the first sensor and the second sensor are directly mounted onto a same substrate.

4. The imaging unit according to claim 1, wherein the transparent member is colored.

5. The imaging unit according to claim 1, wherein the transparent member is made of glass.

6. The imaging unit according to claim 1, wherein the transparent member is made of synthetic resin.

7. An imaging unit comprising:
a first light source adapted to illuminate a first object with first light;
a first sensor, including a first light receiving element adapted to detect the first light by way of the first object;
a second sensor, including a second light receiving element adapted to detect a second light which is externally inputted by way of a second object;
a first lens;
a second lens; and
a transparent member, disposed on an optical path extending from the second object to the second sensor through the second lens, wherein
a first conjugate length of the first lens is equal to a second conjugate length of the second lens,
the first light receiving element is adapted to detect the first light reflected by the first object and the second light receiving element is adapted to detect the second light passing through the second object,
the second light receiving element includes a plurality of kinds of third light receiving elements provided color filters differing in color from one another,
a first longitudinal width of first light receiving element differs from a second longitudinal width of the second light receiving element, and
the third light receiving elements extend in a main scanning direction and are arranged in a sub scanning direction.

8. The imaging unit according to claim 7, wherein the second light includes white light.

9. The imaging unit according to claim 7 wherein the first sensor and the second sensor are directly mounted onto a same substrate.

10. The imaging unit according to claim 7, wherein the transparent member is colored.

11. The imaging unit according to claim 7, wherein the transparent member is made of glass.

12. The imaging unit according to claim 7, wherein the transparent member is made of synthetic resin.

13. An image reading apparatus comprising:
a first light source adapted to illuminate a first object with first light;
a second light source adapted to illuminate a second object with second light;
a first sensor, including a first light receiving element adapted to detect the first light by way of the first object;
a second sensor, including a second light receiving element adapted to detect the second light by way of the second object;
a first lens;
a second lens; and
a transparent member, disposed on an optical path extending from the second object to the second sensor through the second lens, wherein
a first conjugate length of the first lens is equal to a second conjugate length of the second lens,
the first light receiving element is adapted to detect the first light reflected by the first object and the second light receiving element is adapted to detect the second light passing through the second object,
the second light receiving element includes a plurality of kinds of third light receiving elements provided color filters differing in color from one another,
a first resolution of the first sensor is less than a second resolution of the second sensor, and
the third light receiving elements extend in a main scanning direction and are arranged in a sub scanning direction.

14. An image reading apparatus comprising:
a first light source adapted to illuminate a first object with first light;
a second light source adapted to illuminate a second object with second light;
a first sensor, including a first light receiving element adapted to detect the first light by way of the first object;
a second sensor, including a second light receiving element adapted to detect the second light by way of the second object;
a first lens;
a second lens; and
a transparent member, disposed on an optical path extending from the second object to the second sensor through the second lens, wherein
a first conjugate length of the first lens is equal to a second conjugate length of the second lens,
the first light receiving element is adapted to detect the first light reflected by the first object and the second light receiving element is adapted to detect the second light passing through the second object,
the second light receiving element includes a plurality of kinds of third light receiving elements provided color filters differing in color from one another,
a first longitudinal width of first light receiving element differs from second longitudinal width of the second light receiving element, and
the third light receiving elements extend in a main scanning direction and are arranged in a sub scanning direction.

* * * * *